Dec. 17, 1946.   C. E. SLADKY   2,412,918
BUTTERFLY VALVE
Filed Nov. 20, 1944

INVENTOR.
CHARLES E. SLADKY
BY Hyde and Meyer
ATTORNEYS.

Patented Dec. 17, 1946

2,412,918

UNITED STATES PATENT OFFICE 2,412,918

BUTTERFLY VALVE

Charles E. Sladky, Parma Heights, Ohio, assignor to The North American Manufacturing Company, Cleveland, Ohio, a corporation of Ohio Application November 20, 1944, Serial No. 564,258

13 Claims. (Cl. 251—11)

1

This invention relates to valve devices, such as are used for controlling fluid flow through a conduit.

One object of the invention is to provide an improved valve device which is readily adjustable to vary the size of the valve port or opening, thereby readily to match the port size with the downstream conditions in such a way as to obtain better flow characteristics than when the port is of fixed size.

Still another object is to provide an improved butterfly valve having an adjustable port opening, together with means operatable from the outside of the conduit for causing all necessary adjustment.

Another object is to provide an adjustable valve of the character described in which the adjustment may be accomplished without affecting or being affected by any of the usual valve operating devices.

Further objects of the invention in part are obvious and in part will appear more in detail hereinafter.

Figure 1:
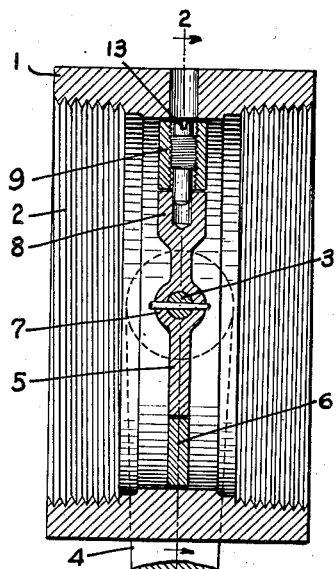
Fig. 1 is a longitudinal sectional elevation through a conduit section to which the invention has been applied.

While the invention is capable of use for controlling the flow of any kind of fluid through a conduit, i. e., either liquid or gas, it is more particularly adapted for controlling gas flow, such as the flow of either fuel gas or air, and the drawings illustrate such a construction, but in no sense of limitation of the invention thereto.

The valve mechanism illustrated includes a hollow body 1, of generally ring or tubular form, designed to be inserted into or form a part of a fluid conduit, for which purpose, for example, it may be provided at opposite ends with threads 2 for the attachment of pipe sections (not shown) thereto. The valve device, itself, is of butterfly form. That is, it includes a circular disc pivoted to turn about a diametrical axis to open or closed positions, or to any intermediate position. The valve disc of the usual butterfly valve for the purpose is of substantially the full inside diameter of the body or member in which it is mounted to swing, so that the port opening is the full pipe size and invariable. With such an arrangement

2 it is impossible to match the valve port with the downstream conditions, because frequently the port size is either too large or too small for the particular system of which the valve forms a part. In the present arrangement the valve devices include means for varying the port size, as will now appear.

In the body or casing is mounted a cross shaft 3, to one end of which is connected suitable operating means, such as an arm 4 capable of actuation manually or automatically so as to adjust the valve back and forth between its extreme open and closed positions, or to any intermediate position that may be desirable or necessary. On the shaft are mounted a single central disc member 5 and one or more rings 6. Both the disc and the rings are generally of sheet form, with the metal thereof as thin as possible to reduce weight. Each of the disc and rings is also provided with a hub portion 7 sleeved upon the shaft 3. The central disc 5 is permanently and fixedly connected to the shaft, as by cross pins 7a, but the rings are free to turn upon the shaft at the hub thereof, except as hereinafter specified.

Figure 2:
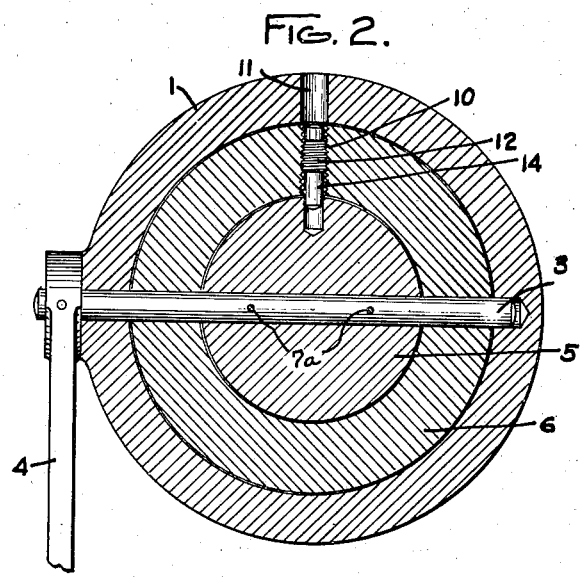
Fig. 2 is a cross section on the line 2—2, Fig. 1.
Figure 3:
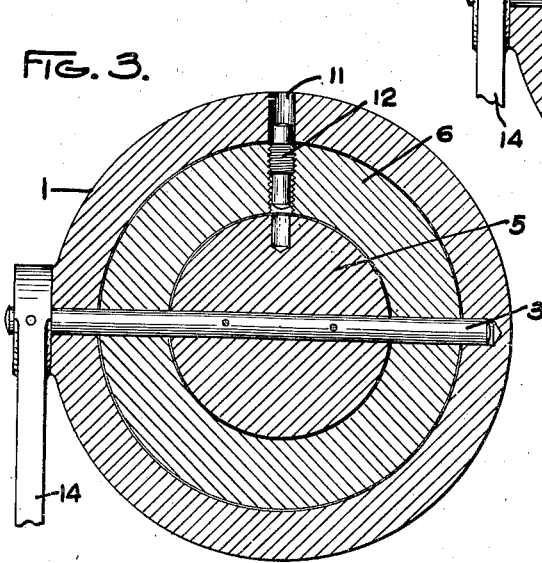
Fig. 3 is a view corresponding to Fig. 2 and showing another arrangement of the parts.

Figs. 1 to 3 inclusive show a single central disc 5 and a single ring 6. Means is provided for firmly affixing the ring either to the disc or to the body, and preferably of such form as to enable the appropriate connection to be established by manipulation from the outside of the conduit after the valve has been finally connected or assembled in the flow system of which it forms a part. In the arrangement shown, the disc 5 and ring 6 are provided with radially extending aligned tubular bosses 8, 9, the latter internally threaded, as at 10. In the closed position of the valve, as shown in Fig. 1, the openings in the two bosses are aligned with each other and with an opening 11 in the body member 1. Through this opening 11 may be inserted and manipulated, as by a screw driver, a plug 12 having a screw driver slot 13 at its outer end and a plain extension 14 at its inner end. The body or the plug 12 is threaded to correspond with the threads 10. By adjusting the plug 12 to the position shown in Fig. 3 no part of it enters the opening in the disc 5, but its head lies in the opening 11 of the body, and its central body portion lies in the opening of the ring 6. Consequently the ring is firmly anchored to the tubular body 1 and forms a part thereof, and the swinging valve includes the central disc 5 alone. The port opening consequently is circular and with the same diameter as that of the disc.

If, for any reason, a larger port opening is desirable, the plug 12 may be screwed into the position shown in Fig. 1, in which its inner plain end enters the opening in the tubular boss of the disc 5 and its head is withdrawn entirely from the opening 11 in the body 1. Now, the ring and disc are firmly anchored together and the port opening is circular with the same diameter as the external diameter of the ring.

Figure 4:
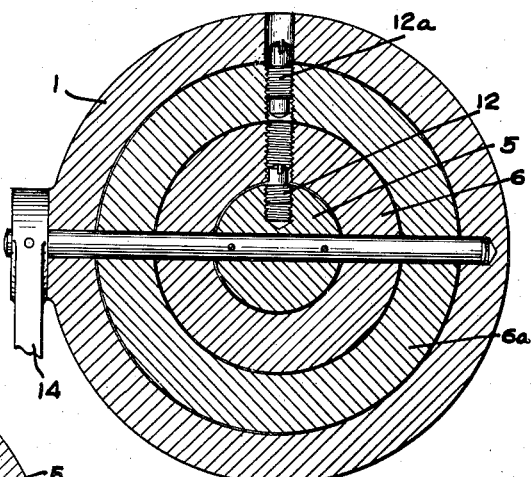
Fig. 4 is a view, corresponding to Fig. 2, and showing another form of valve device embodying the invention.

The valve mechanism may include any desired number of washer-form rings, surrounding a single circular disc. For example, in the arrangement shown in Fig. 4, I have provided a valve device including a central disc 5 and two rings 6, 6a. Here I employ two threaded plugs 12, 12a, working in threads of the tubular bosses of the ring and disc. These plugs may be adjusted to various positions. For example, as shown, plug 12 crosses the joint between the disc 5 and the ring 6, and anchors them together, while plug 12a crosses the joint between the ring 6a and the body 1, and anchors them together. But, by other adjustments of said plugs the ring 6 may be anchored to ring 6a and the two rings 6, 6a, thus joined, may be anchored either to the body 1 or to the disc 5, giving three possible sizes of valve port, with operation as before.

The arrangement described is of simple construction, can be manufactured and sold at low cost, is capable of convenient adjustment from the outside of the conduit, and is satisfactory in operation.

What I claim is:

1. Butterfly valve mechanism of the character described, comprising a valve body having an opening through which fluid may be conducted, a shaft extending across said opening, a valve disc affixed to said shaft and movable therewith between closed and open positions, a flat ring of generally washer form surrounding said disc and mounted for swinging movement about the shaft axis, and means for affixing said ring selectively either to the valve body or to the shaft for movement with said disc.

2. Butterfly valve mechanism, comprising a tubular body member having a cross shaft rotatably mounted therein, and a plurality of generally circular flat valve members mounted upon said shaft in coaxial and coplanar relation, the inner member being of disc form and fixedly secured to the shaft, and means operatable from the outside of the body member for securing an outer valve member either immovably to the body member or to the disc member for rotation therewith.

3. In combination, a tubular body, a cross shaft mounted therein, a series of disc and ring form valve members mounted upon said shaft in coaxial coplanar relation, and means inclosed within the body and mounted upon said members for generally radial adjustment thereon to affix selected ones thereof to said shaft and others to said body.

4. In combination, a tubular body, and a series of washer form and disc form valve members mounted therein in coplanar coaxial relation, a rotatable cross shaft, and means for affixing varying numbers of said members to said body to be immovable with respect thereto and others to said shaft to be rotatable therewith, to thereby vary the effective area of the valve opening.

5. Valve mechanism of the character described, comprising a tubular valve body having a fluid conducting channel, a diametrical cross shaft rotatably mounted in said body, a valve disc affixed to said shaft and concentric with the tubular body when disposed crosswise thereof, a ring surrounding said disc and in coaxial and coplanar relationship therewith when disposed crosswise of the body, and locking means mounted on the ring and adjustable thereon into engagement with the valve body for holding the ring stationary.

6. Valve mechanism of the character described, comprising a tubular valve body having a fluid conducting channel, a diametrical cross shaft rotatably mounted in said body, a valve disc affixed to said shaft and concentric with the tubular body when disposed crosswise thereof, a ring surrounding said disc and in coaxial and coplanar relationship therewith when disposed crosswise of the body, and locking means mounted on the ring and adjustable thereon transversely to the length of the shaft into engagement with the valve body for holding the ring stationary.

7. Valve mechanism of the character described, comprising a tubular valve body having a fluid conducting channel, a diametrical cross shaft rotatably mounted in said body, a valve disc affixed to said shaft and concentric with the tubular body when disposed crosswise thereof, a ring surrounding said disc and in coaxial and coplanar relationship therewith when disposed crosswise of the body, and locking means mounted on the ring and adjustable thereon into engagement either with the disc or with the body for fixing the ring to either thereof.

8. Valve mechanism of the character described, comprising a tubular valve body having a fluid conducting channel, a diametrical cross shaft rotatably mounted in said body, a valve disc affixed to said shaft and concentric with the tubular body when disposed crosswise thereof, a ring surrounding said disc and in coaxial and coplanar relationship therewith when disposed crosswise of the body, and locking means mounted on the ring and adjustable thereon into engagement either with the disc or with the body for fixing the ring to either thereof, said means being adjustable in a direction transversely to the length of the shaft.

9. Valve mechanism of the character described, comprising a tubular valve body having a fluid conducting channel, a diametrical cross shaft rotatably mounted in said body, and valve means controlling fluid flow through said channel, comprising disc and ring members mounted upon said shaft in coplanar coaxial relation, and means operatable from the outside of the body and adjustable along a line normal to the length of said shaft and to the disc axis for fixing an outer one of said members to the valve body and an inner one thereof to the shaft.

10. Valve mechanism of the character described, comprising a tubular valve body having a fluid conducting channel, a diametrical cross shaft rotatably mounted in said body, and valve means controlling fluid flow through said channel, comprising disc and ring members mounted upon said shaft in coplanar coaxial relation, said body and disc and ring members being provided with openings which are aligned and extend transversely to the shaft when the disc and ring members lie crosswise of said channel, and means adjustable along said openings for locking a ring member either to the shaft or to the body.

11. Valve mechanism of the character described, comprising a tubular valve body having a fluid conducting channel, a diametrical cross shaft rotatably mounted in said body, and valve means controlling fluid flow through said channel, comprising disc and ring members mounted upon said shaft in coplanar coaxial relation, said disc and ring members being provided with radially extending aligned threaded openings extending transversely to the shaft, and threaded plug means adjustable along said openings for locking a ring member to the shaft.

12. Valve mechanism of the character described, comprising a tubular valve body having a fluid conducting channel, a diametrical cross shaft rotatably mounted in said body, and valve means controlling fluid flow through said channel, comprising disc and ring members mounted upon said shaft in coplanar coaxial relation, said disc and ring members being provided with radially extending aligned threaded openings extending transversely to the shaft, and threaded plug means adjustable along said openings for locking a ring member to the body.

13. Valve mechanism of the character described, comprising a tubular valve body having a fluid conducting channel, a diametrical cross shaft rotatably mounted in said body, and valve means controlling fluid flow through said channel, comprising disc and ring members mounted upon said shaft in coplanar coaxial relation, said disc and ring members being provided with radially extending aligned threaded openings extending transversely to the shaft, and threaded plug means adjustable along said openings for locking a ring member either to the shaft or to the body.

CHARLES E. SLADKY